United States Patent

Hayakawa

[11] Patent Number: 5,874,702
[45] Date of Patent: Feb. 23, 1999

[54] WIRE CUT ELECTRICAL DISCHARGE MACHINE

[75] Inventor: Jun Hayakawa, Fukui, Japan

[73] Assignee: Sodick Co., Ltd., Japan

[21] Appl. No.: 809,413

[22] PCT Filed: Sep. 30, 1996

[86] PCT No.: PCT/JP96/02853

§ 371 Date: Apr. 24, 1997

§ 102(e) Date: Apr. 24, 1997

[87] PCT Pub. No.: WO97/11808

PCT Pub. Date: Apr. 3, 1997

[30] Foreign Application Priority Data

Sep. 29, 1995 [JP] Japan .................................. 7-275050

[51] Int. Cl.⁶ .................................................. B23H 7/10
[52] U.S. Cl. ............................................................ 219/69.12
[58] Field of Search ............................... 219/69.12, 69.14

[56] References Cited

U.S. PATENT DOCUMENTS

| | | | |
|---|---|---|---|
| 4,242,558 | 12/1980 | Kunze | 219/69.12 |
| 4,698,478 | 10/1987 | Girardin | 219/69.12 |
| 4,751,364 | 6/1988 | Tobler et al. | 219/69.12 |
| 5,047,607 | 9/1991 | Briffod | 219/69.12 |
| 5,288,965 | 2/1994 | Gambin et al. | 219/69.12 |
| 5,357,072 | 10/1994 | Garwick | 219/69.12 |
| 5,523,538 | 6/1996 | Matsuda . | |

FOREIGN PATENT DOCUMENTS

| | | | |
|---|---|---|---|
| 56-21732 | 2/1981 | Japan . | |
| 56-119325 | 9/1981 | Japan | 219/69.12 |
| 63-11232 | 1/1988 | Japan . | |
| 63-120033 | 5/1988 | Japan | 219/69.12 |
| 63-283825 | 11/1988 | Japan | 219/69.12 |
| 64-20929 | 1/1989 | Japan | 219/69.12 |
| 2-59221 | 2/1990 | Japan | 219/69.12 |
| 2-38143 | 3/1990 | Japan . | |
| 4-51287 | 8/1992 | Japan . | |
| 4-300122 | 10/1992 | Japan . | |

OTHER PUBLICATIONS

Supplementary European Search Report, No Publication Date.

Primary Examiner—Geoffrey S. Evans

[57] ABSTRACT

A wire cut electrical discharge machining device including a work tank (31) which holds a workpiece (8), a wire cutting device (11) which cuts the wire electrode used to generate a electrical discharge in the gap between the wire electrode (32) and the workpiece into small pieces, a container (12), mounted outside the work tank, to hold the small wire pieces, and a malleable guide tube (13), one end (13A) of which is connected to the wire cutting device, and the other end (13B) of which is directed toward the container. Small wire parts are conveyed to the container by the flow of a fluid (15) introduced to the guide tube. The container includes a filter (12A) to separate the small wire pieces and the fluid.

10 Claims, 6 Drawing Sheets

WIRE CUT ELECTRICAL DISCHARGE MACHINE

FIELD OF THE INVENTION

The present invention relates to a wire cut electrical discharge machining device which, using a traveling wire electrode, machines a workpiece by generating electrical discharges in a gap formed between the wire electrode and the workpiece to be machined. In particular, the present invention relates to a wire cut electrical discharge machine equipped with a recovery device to recover the wire electrode used to generate the electrical discharges.

BACKGROUND OF THE INVENTION

Wire cut electrical discharge machining devices are known in which a continuous wire-shaped electrode, unwound from a wire supply source such as a bobbin or reel, is fed into a work tank or pan in which the workpiece is held and, after being used to generate electrical discharges in the space formed between the wire electrode and the workpiece — the machining "gap" — is taken up by a recovery roller. In devices of this type, the winding of the wire electrode on the recovery roller side can have undesirable effects on the wire electrode which is traveling through the gap side.

Wire cut electrical discharge machining devices having a container provided outside of the work tank with sufficient capacity to recover the spent wire electrode, and a mechanism for conveying the wire electrode from the gap to the container are known. Generally, such wire conveying mechanisms include a device mounted in proximity to the wire recovery container to pull the wire electrode, and a part for feeding the wire electrode from the gap to the wire pulling device, for example multiple feed rollers and pulleys, conveyor belts, or guide tubes into which a fluid is introduced, have been used for this purpose. In addition, a device which imparts curl to the wire may be provided between the wire pulling device and the container, so that the wire can be stored in an orderly manner in the container. Alternatively, a device for cutting the wire into small pieces may be provided. Such additional devices improve the storage capacity of the container.

Normally, the tension imparted to the wire electrode as it travels through the gap side is controlled by the joint action of a brake device, which is provided between the wire supply device and the gap, and which imparts an adjustable damping on the wire, and the wire pulling device. The wire pulling device performs a portion of the tension control function, so that failures along the travel path between the gap and the wire pulling device, such as wire straying from the travel path or wire jamming, may be transmitted to the wire electrode passing through the gap and cause poor machining accuracy. In particular, such failures can easily occur when automatically threading the leading end of a wire having a diameter less than, for example, about 0.1 mm, to pass through the initial hole in the workpiece and on to the pulling device.

SUMMARY OF THE INVENTION

An object of the present invention is to provide a wire cut electrical discharge machining device in which failures along the travel path of the wire electrode used to generate electrical discharge do not cause undesirable effects on the wire electrode traveling through the gap.

Another object of the present invention is to provide an electrical discharge machining device equipped with a simply constituted device for the processing of used wire electrode.

Other objects of the present invention are discussed in the explanation which follows, and will be apparent to practitioners of the art through implementation of the invention.

A wire cut electrical discharge machining device according to the present invention causes electrical discharges to occur in the gap formed between a wire electrode and a workpiece using a continuous traveling wire electrode, which machines the workpiece, and comprises a work tank which holds the workpiece, a wire cutting device which cuts the wire electrode used to generate an electrical discharge into small pieces, a container to recover the small wire pieces, and, mounted outside the work tank, a device for conveying the small pieces to a recovery means.

Preferably, the conveying device includes a malleable guide tube, one end of which is connected to the wire cutting device, and the other end of which faces the recovery container. The small wire pieces are conveyed to the recovery container by the flow of a fluid introduced into the guide tube.

PREFERRED EMBODIMENT OF THE INVENTION

Figure 1:
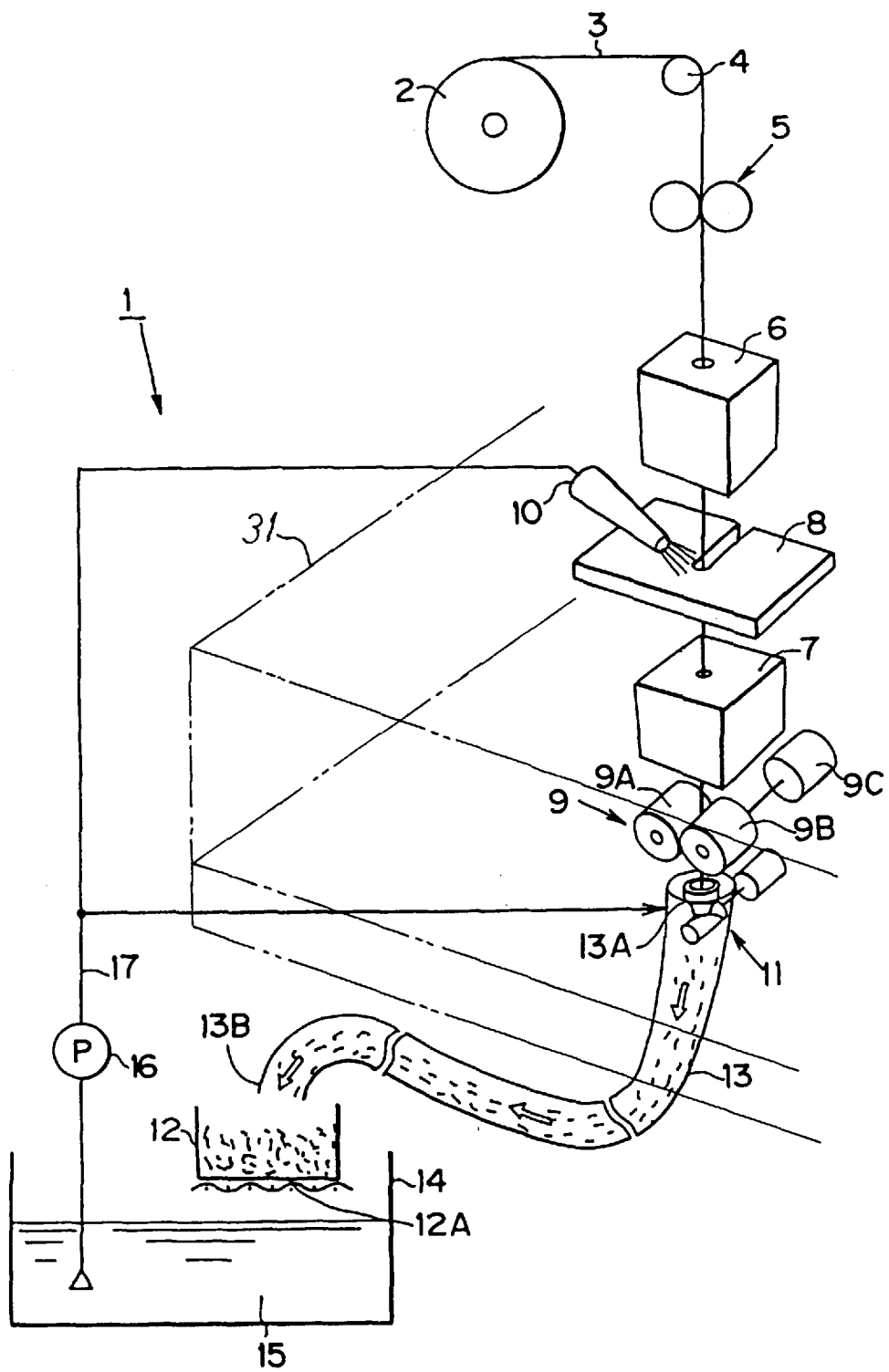
FIG. 1 is a schematic depiction in partial perspective of a first embodiment wire cut electrical discharge machining device according to the present invention.

FIG. 1 illustrates the wire cut electrical discharge machining device 1 according to the present invention. The wire cut electrical discharge machining device 1 includes a work tank or pan 31 to hold a workpiece 8 to be machined, and a continuous wire-shaped electrode 3. The size of work tank 31 depends on the size of the workpiece 8, or on the degree of movement of the wire electrode 3 relative to the workpiece 8. The workpiece 8 is attached to the a stand (not illustrated) provided on the work tank 31. It is positioned between an upper wire guide device 6 and a lower wire guide device 7. A wire electrode 3, which is unwound from a wire supply bobbin 2, passes through a guide roller 4, a brake device 5, and a pair of wire guide devices 6 and 7 positioned opposite the workpiece 8, and is fed to a wire pulling device 9 positioned directly underneath the lower wire guide device 7. The pair of wire guide devices 6 and 7 which guide the traveling wire electrode 3 respectively contain within them die guides which precisely determine the position of the wire electrode 3 relative to the workpiece 8. The wire pulling device 9 includes a pair of rollers 9A and 9B, which press against each other, and a motor 9C which drives the roller 9B. The wire electrode 3, which is sandwiched between the pair of rollers 9A and 9B is pulled downward by the rotation of the rollers. The tension imparted to the wire electrode 3 traveling between the pair of wire guide devices 6 and 7 is determined by the pulling force due to the wire pulling device 9, and by damping imparted to the wire by means of the brake device 5.

Reference numeral 10 indicates a nozzle which discharges a dielectric fluid having a high restivity, such as deionized water, toward the gap formed between the traveling wire electrode 3 and the workpiece 8. A dielectric fluid 15 stored in a fluid supply tank 14 is fed by means of a pump 16 through a supply tube 17 to the nozzle 10 provided on the work tank 31. The dielectric fluid 15 discharged into the gap is collected by the work tank or pan 31 and is returned from the drain hole on the work tank 31 through an appropriate tube to the fluid supply tank 14. The workpiece 8 may also be submerged in the dielectric fluid 15 with which the work tank 31 is filled, in which case the nozzle 10 is not required. To simplify the explanation, the power supply device which applies a voltage pulse between the wire electrode 3 and the workpiece 8 is here omitted.

Directly underneath the wire pulling device 9, the wire cut electrical discharge machining device 1 includes a wire cutting device 11, which is mounted inside the work tank 31 and which cuts the wire electrode 3 into, for example, small pieces of several mm in length. The wire cutting device 11, the wire pulling device 9, and the pair of wire guide devices 6 and 7 are arrayed in a straight line, and parts such as rollers for changing the travel direction of the wire are not mounted between those devices. A guide tube 13, connected to the wire cutting device 11 on one end 13A, which has an entrance opening for small wire pieces is provided. The tube 13 passes through an opening (not shown) formed in the bottom or side wall of the work tank 31 and extends to the outside of the work tank 31. The other end 13B of the guide tube 13 is directed toward a recovery device 12, which recovers the small wire pieces. The small wire pieces are fed to the recovery device 12 mounted on the outside of the work tank 31 by the flow of a fluid introduced into the guide tube 13. In the illustrated embodiment, the dielectric fluid 15 stored in the fluid supply tank 14 is supplied to the inside of the guide tube 13 through the supply tube 17 by the pump 16.

In this manner, the wire electrode 3 is cut into small pieces as soon as it is used to generate electrical discharges in the gap, so that failures along the path over which the small pieces are conveyed to the recovery container 12, which is to say in the guide tube 13, will not cause undesirable effects on the portion of the wire electrode 3 traveling through the gap. Furthermore, the wire cutting device 11 is preferably positioned as close as possible to the gap, which is in the work tank 31, so that the wire pulling device 9 may also be positioned in proximity to the gap. Therefore the action of threading the wire electrode 3 through the initial hole formed in the workpiece to the wire pulling device 9— known as "automatic wire threading"— is accomplished reliably and quickly. Additionally, the wire electrode 3 is cut into small pieces of several mm in length, so that the small pieces may be easily conveyed to the recovery device 12 which may be positioned at some distance from the wire cutting device 11. In other words, the small pieces are reliably conveyed by a simply constituted device regardless of the conveyance path distance between the wire cutting device 11 and the recovery device 12, or of twists in the conveyance path for wending around other parts.

The recovery device 12 may comprise a container for receiving the small wire pieces and the dielectric fluid 15 emerging from the exit hole on the guide tube 13. A net-shaped filter 12A, which separates the small wire pieces from the dielectric fluid 15, is provided on the bottom of the recovery device 12. The dielectric fluid 15 which passes through the filter 12A is thereby returned to the fluid supply tank 14.

Figure 2:
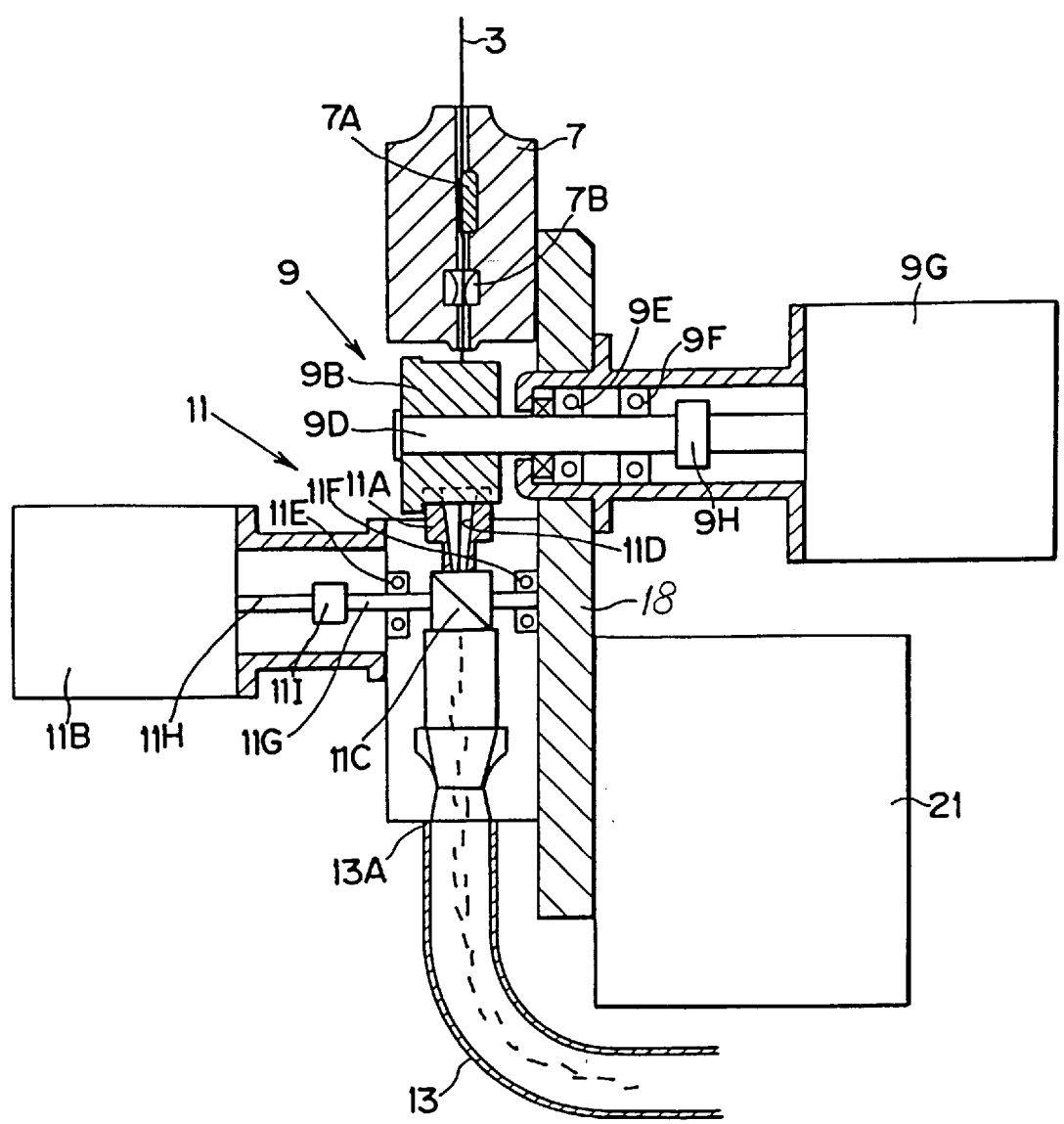
FIG. 2 is an elevation view, in partial section, showing an example of the wire pulling device and the wire cutting device illustrated in FIG. 1.
Figure 3:
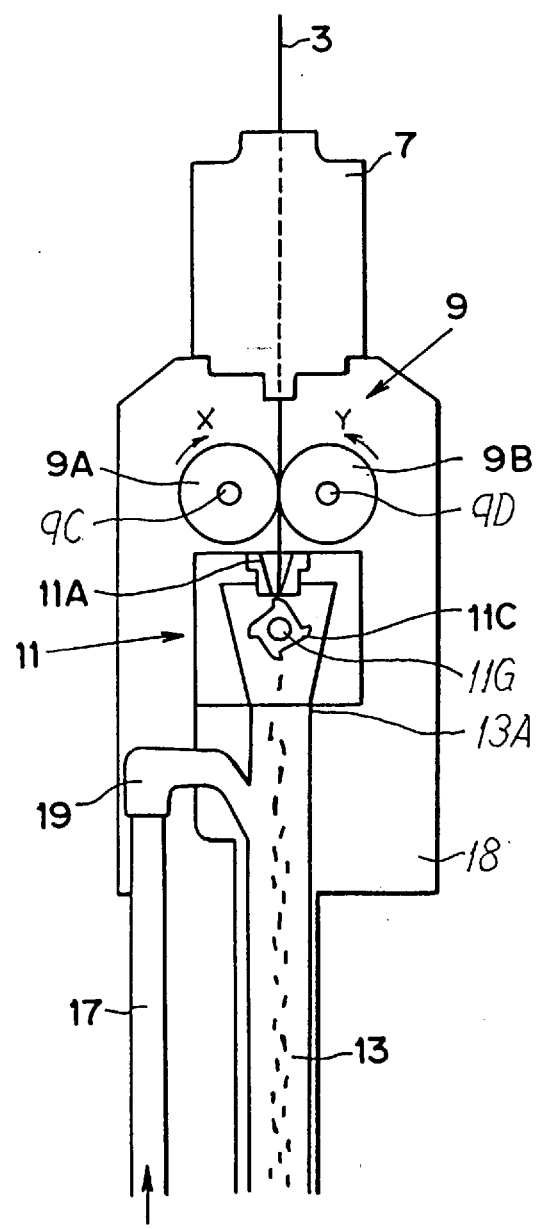
FIG. 3 is a side view, illustrating sections of wire created by the wire pulling device and the wire cutting device shown in FIG. 2.

An example of the wire pulling device 9 and wire cutting device 11 will now be explained with reference to FIGS. 2 and 3. The lower wire guide device 7, the wire pulling device 9, and the wire cutting device 11 are held by a movable part 18, which moves along a guide rail 21. The upper wire guide device 6 can move by a drive mechanism separate from the lower wire guide device drive mechanism. In this manner, the wire electrode 3 which travels between the pair of wire guide devices 6 and 7 can be moved relative to the workpiece 8. As is best shown in FIG. 2, the lower wire guide device 7, which has a through hole through which the wire electrode 3 travels, includes a feeder 7A which feeds power from a power supply device to the wire electrode, and a die 7B, which determines the position of the wire electrode 3 relative to the workpiece 8. The wire electrode 3, which has passed through the through hole in the lower wire guide device 7, is immediately received by the wire pulling device 9. The wire pulling device 9 includes a driven roller 9B affixed to the movable part 18, which is attached so as to be rotatable by the motor 9C, by means of a rotating axle 9D, the roller 9B being fixed to the rotating axle 9D. The rotating axle 9D is supported so as to be rotatable in a housing and attached by a pair of hubs 9E and 9F to the movable part 18. The wire pulling device 9 further includes a drive motor 9G connected via a coupling 9H to the rotating axle 9D. As is shown in FIG. 3, the pair of rollers 9A and 9B, which press against one another, rotate respectively in the X and Y directions by means of the rotation of the drive motor 9G. The wire electrode 3 is pulled by means of the pair of rollers 9A and 9B until it reaches the wire cutting device 11 positioned directly beneath the wire pulling device.

The wire cutting device 11 includes a cutter 11A fabricated of super-hard alloy, a rotatable end mill cutter 11C, and a drive motor 11B which is affixed to the movable part 18 and rotates the end mill cutter 11C. The cutter 11A has a guide hole 11D, the cross-sectional area of which decreases in the direction of travel of the wire electrode 3, through which the wire electrode 3 passes. The end mill cutter 11C is affixed to a rotating axle 11G, which is linked by a coupling 11I to an output axle 11H on the drive motor 11B. The rotating axle 11G is supported so as to be rotatable relative to the movable part 18 by means of hubs 11E and 11F. The wire electrode 3, as it is fed out from the exit of the guide hole 11D, is cut into small pieces of several mm length by the rotation of the end mill cutter 11C. In place of the wire cutting device 11 in the illustrated embodiment, a device which, for example, cuts the wire electrode electrically could also be provided.

The guide tube 13 is constituted as a malleable tube, preferably made up of synthetic resin. One of its ends 13A is linked to the wire cutting device 11. As is best shown in FIG. 3, a fluid supply hole 19 is provided which connects the supply tube 17 to the guide tube 13 in the vicinity of the entry hole 13A. Small wire pieces are drawn into the intake hole 13A by the introduction of the pressurized dielectric fluid to the inside of the guide tube 13 from the supply hole 19. The fluid introduced to the guide tube 13 may also be a fluid other than the dielectric fluid 15, such as, e.g., a pressurized gas.

Figure 4:
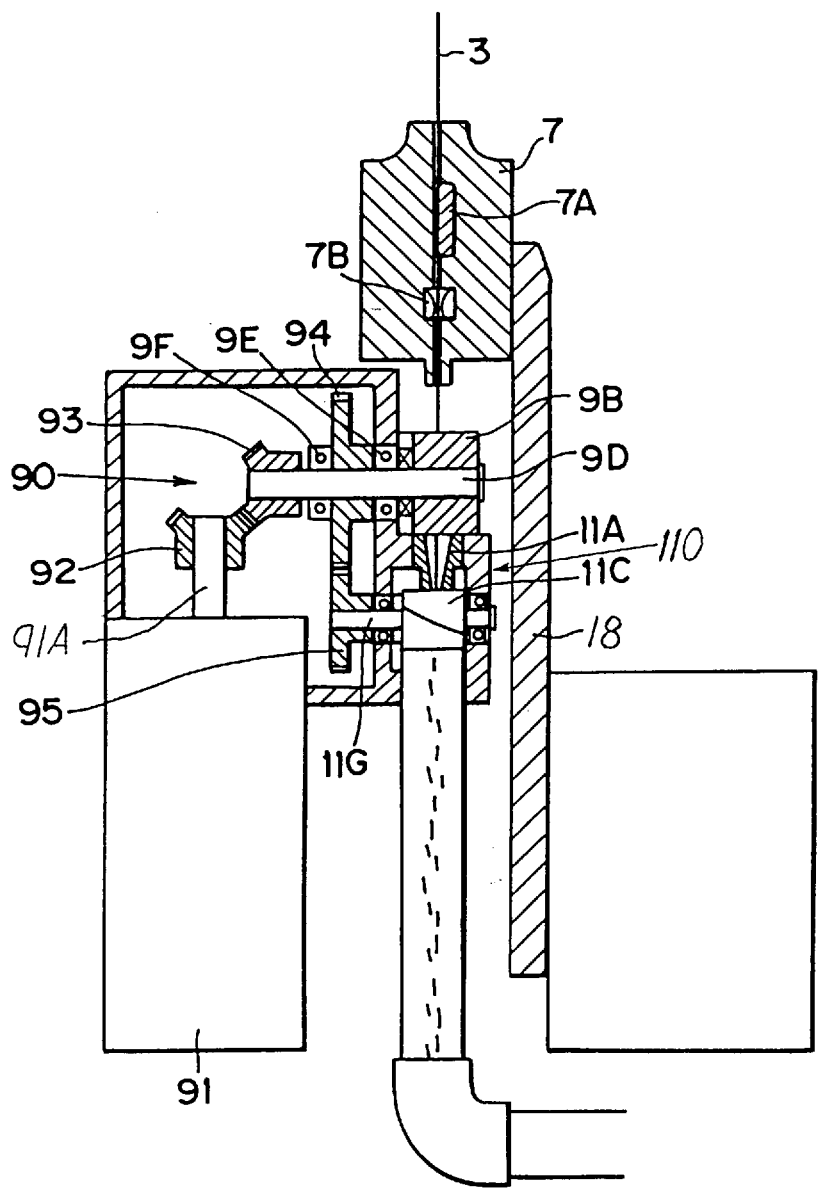
FIG. 4 is a view, in partial section, showing another example of the wire pulling device and the wire cutting device of FIG. 1.

Another example of the wire pulling device and the wire cutting device is explained with reference to FIG. 4. Devices similar to that used in FIG. 2 are indicated by the same reference numerals, and a detailed explanation thereof is here omitted. The wire pulling device 90 and wire cutting device 110 illustrated in FIG. 4 are similar to the wire pulling device 9 and wire cutting device 11 illustrated in FIGS. 2 and 3, except that the roller 9B and the end mill cutter 11C are driven by a single motor 91. The rotation of the output axle 91A of the motor 91 is transferred to the rotating axle 9D, which is fixed to the roller 9B, by means of umbrella gears 92 and 93. Rotation of the rotating axle 9D is transferred to the rotating axle 11G, positioned parallel to the rotating axle 9D, which is affixed to the end mill cutter 11C by means of flat gears 94 and 95. By this configuration, the use of an extra motor can be eliminated. Furthermore, the combination of the wire pulling device 9 and the wire cutting device 11 becomes more compact, so the size of the work tank 31 is not made excessively large.

Figure 5:
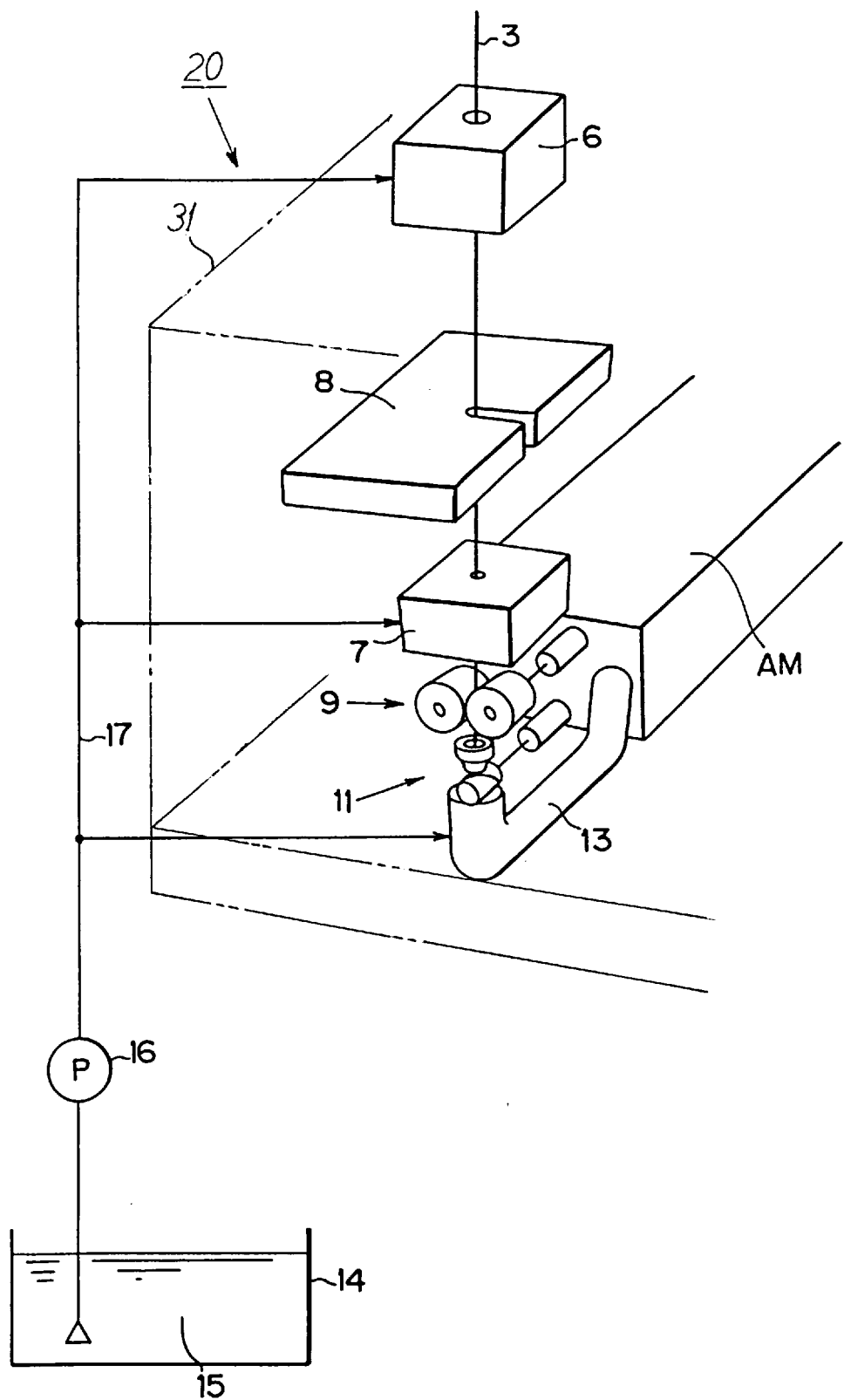
FIG. 5 is a schematic depiction of a second embodiment wire cut electrical discharge machining device according to the present invention.

FIG. 5 illustrates a second embodiment wire cut electrical discharge machining device 20 according to the present invention. The wire cut electrical discharge machining device 20 includes a part positioned outside the work tank 31, for example an arm AM, one end of which is supported by a column (not illustrated), and which penetrates an opening formed in the side wall of the work tank 31 or extends into the work tank 31 beyond that side wall. The lower wire guide device 7, the wire pulling device 9, and the wire cutting device 11 are fixed to the other end of the arm AM. The arm AM can move relative to the work tank 31 or to the workpiece 8. The guide tube 13 passes through the interior of the arm AM and reaches the recovery device positioned outside of the work tank 31. In the FIG. 5 embodiment, the dielectric fluid 15 from the fluid supply tank 14 is supplied to the gap through the pair of wire guide devices 6 and 7.

Figure 6:
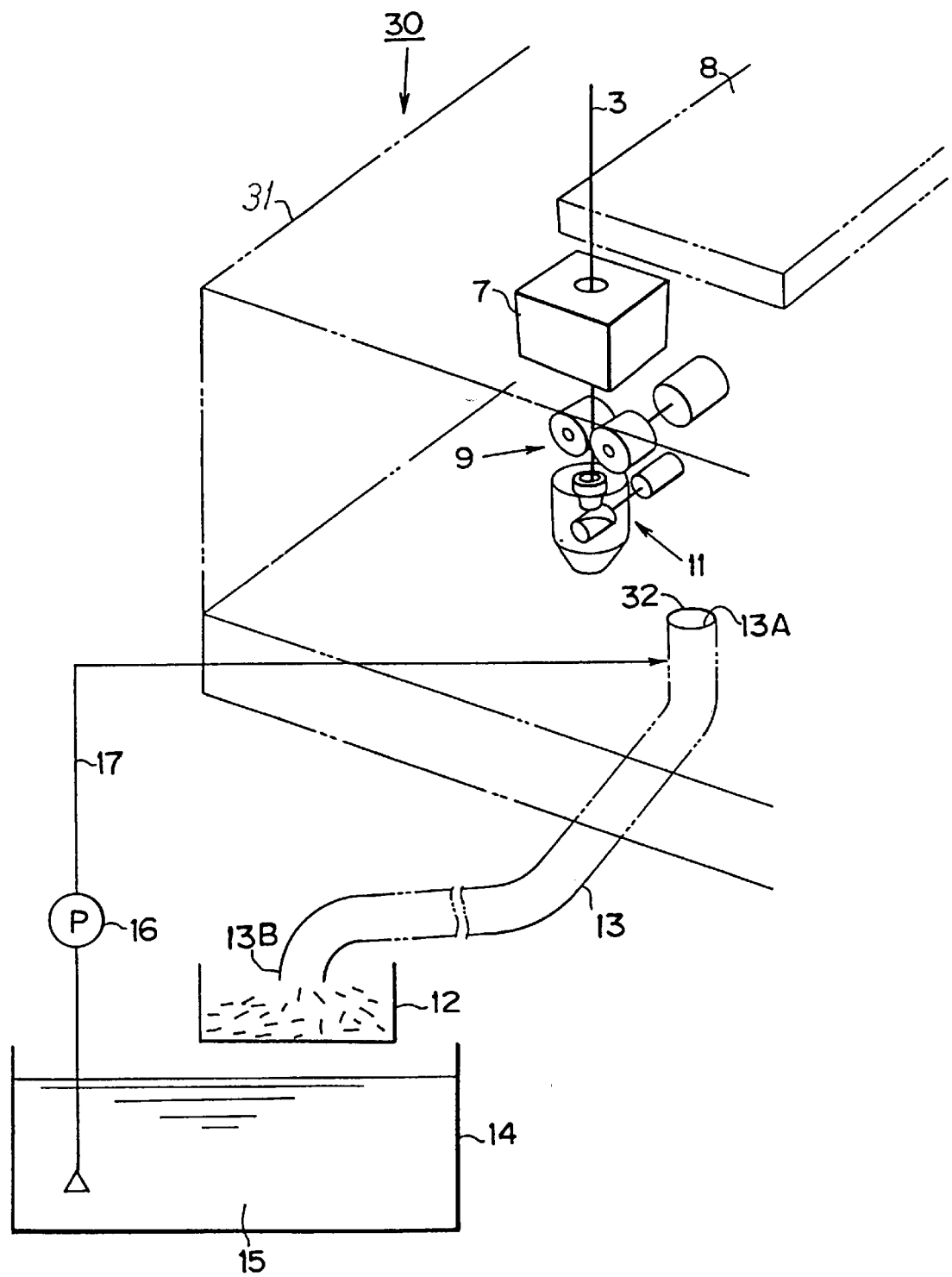
FIG. 6 is a schematic depiction of a third embodiment wire cut electrical discharge machining device according to the present invention.

FIG. 6 illustrates a third embodiment wire cut electrical discharge machining device 30 according to the present invention. One end 13A of the guide tube 13 is connected to an opening 32, which is formed in the bottom of the work tank 31 for the purpose of evacuating the dielectric fluid 15 supplied to the gap. The small pieces which fall from the wire cutting device 11 to the bottom of the work tank 31 are gathered to the opening 32 by means of the flow of the evacuated dielectric fluid 15 and sent to the recovery device 12 through the guide tube 13. An additional fluid supply device may also be provided to supply sufficient fluid to the interior of the work tank 31 to reliably gather the small wire pieces which accumulate on the bottom of the work tank 31 toward the opening 32. As in the wire cut electrical discharge machining device illustrated in FIGS. 1 and 5, the dielectric fluid 15 is introduced to the guide tube 13 from the supply tube 17.

In the embodiment in FIG. 6, there is no element to interfere with the movement of the lower wire guide device 7, so the lower wire guide device 7— in other words the wire electrode 3— is positioned with high accuracy. It is not intended that the present invention be limited to the exact forms disclosed. It should be clear with reference to the above explanation that many improvements and variations on the present invention are possible. The above embodiments were selected and described in order to explain the nature and the practical application of the invention. The scope of the invention is to be defined by the appended claims.

I claim:

1. A wire cut electrical discharge machine for machining a workpiece by electrical discharges in a machining gap formed between the workpiece and a wire electrode as said wire electrode travels through an upper and a lower wire guide, each positioned on an opposite side of the workpiece, the wire cut electrical discharge machine comprising:

a wire puller positioned adjacent to and downstream of the lower wire guide for pulling the wire electrode through the upper and lower wire guides;

a wire cutter for cutting the wire electrode pulled by the wire puller into small pieces;

a recovery device for recovering the small pieces;

a guide tube, extending essentially between the wire cutter and the the recovery device; and a fluid supply for supplying fluid to the guide tube and, by flow of that fluid through the guide tube, for conveying the small pieces to the recovery device.

2. The wire cut electrical discharge machine according to claim 1, further comprising a work tank for containing the workpiece and wherein the wire cutter is disposed in said work tank.

3. The wire cut electrical discharge machine according to claim 2, further comprising a moveable member, moveable along a guide rail, said movable member supporting the lower wire guide, the wire puller and the wire cutter.

4. A wire cut electrical discharge machine for machining a workpiece by electrical discharges in a machining gap formed between the workpiece and a wire electrode as said wire electrode travels through an upper and a lower wire guide, each positioned on an opposite side of the workpiece, the wire cut electrical discharge machine comprising:

a dielectric fluid supply for supplying dielectric fluid to the machining gap;

a work tank for containing the work piece, the work tank having an opening formed in the bottom thereof to evacuate the dielectric fluid therefrom;

a wire puller positioned adjacent to and downstream of the lower wire guide for pulling the wire electrode through the upper and lower wire guides;

a wire cutter mounted in the work tank, for cutting the wire electrode as it is pulled by the wire puller into small pieces;

a recovery device for recovering the small pieces; and, a guide tube extending essentially between the work tank opening and the recovery device.

5. A wire cut electrical discharge machine for machining a workpiece by electrical discharges in a machining gap formed between a wire electrode and the workpiece using a traveling, continuous wire electrode, the wire cut electrical discharge machine comprising:

a workpiece containing tank for containing the workpiece;

a wire cutter, mounted within the workpiece containing tank for cutting the wire electrode, after it is used to generate electrical discharges, into small pieces;

a recovery device, mounted outside the workpiece containing tank for recovering the small pieces; and, a tubular device for conveying the small pieces to the recovery device.

6. The wire cut electrical discharge machining according to claim 5, wherein the tubular device includes a malleable guide tube, one end of which is connected to the wire cutter, and another end of which is directed toward the recovery device, and a fluid supply for introducing a fluid to the guide tube such that the small pieces are conveyed to the recovery device by the fluid flow.

7. The wire cut electrical discharge according to claim 5, wherein the recovery device includes a filter to separate the small pieces and the fluid.

8. The wire cut electrical discharge machine according to claim 5, wherein the work piece containing tank has an opening and including a means for gathering the small pieces to said opening, a guide tube extending essentially between said opening and the recovery device, and a fluid supply for introducing fluid to the guide tube such that the small pieces are conveyed to the recovery device by the flow of fluid.

9. The wire cut electrical discharge machine according to claim 5, further including a pair of wire guides for guiding the wire as it travels through said machining gap, of said pair of wire guides being arrayed on opposite sides of the workpiece, and a wire puller for pulling the wire electrode which has passed through the wire guides toward the wire cutter, the pair of wire guides, the wire puller, and the wire cutter being arrayed in a straight line.

10. The wire cut electrical discharge machine according to claim 5, wherein the wire puller comprises a pair of pinch rollers, at least one of said pinch rollers being driven wherein the wire electrode, when engaged by said pinch rollers, is pulled by the rotation thereof.

* * * * *